UNITED STATES PATENT OFFICE.

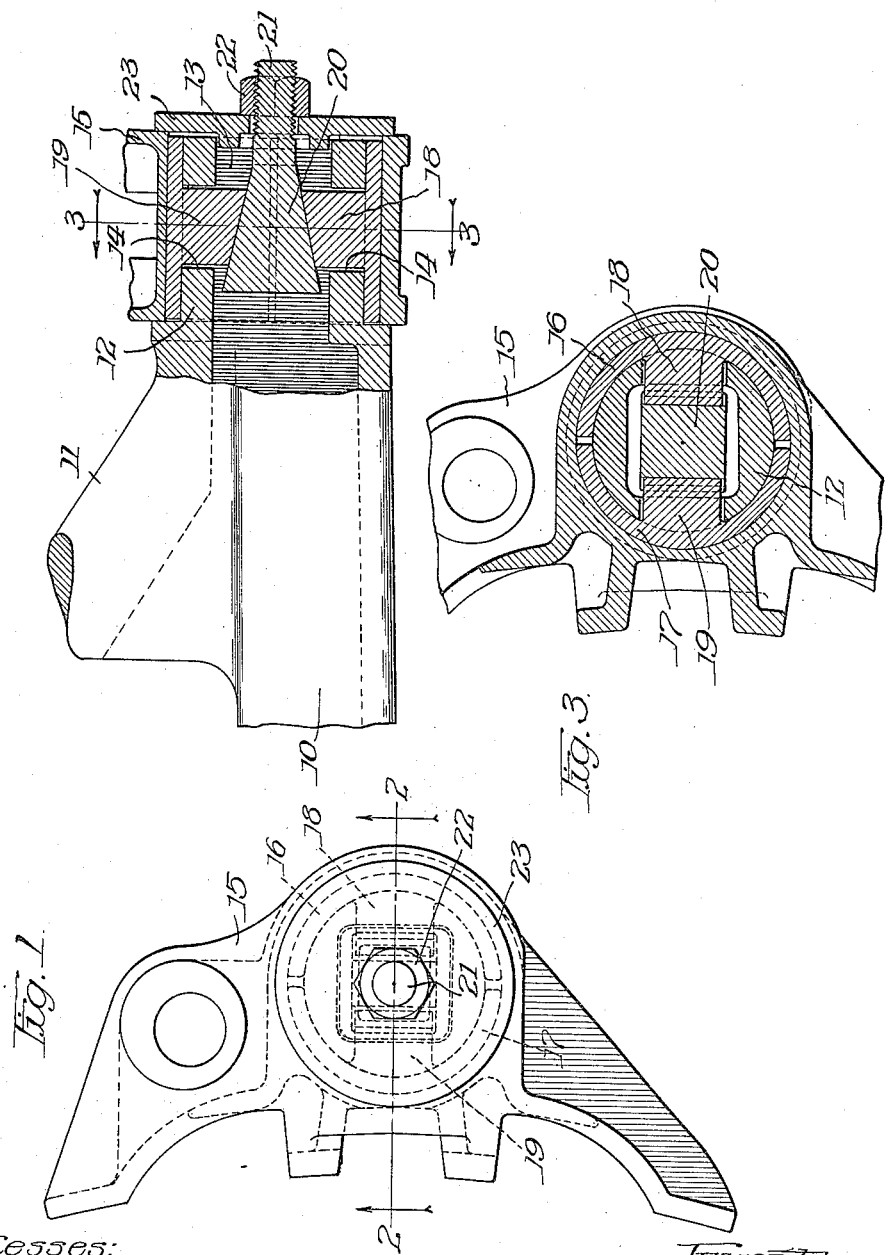

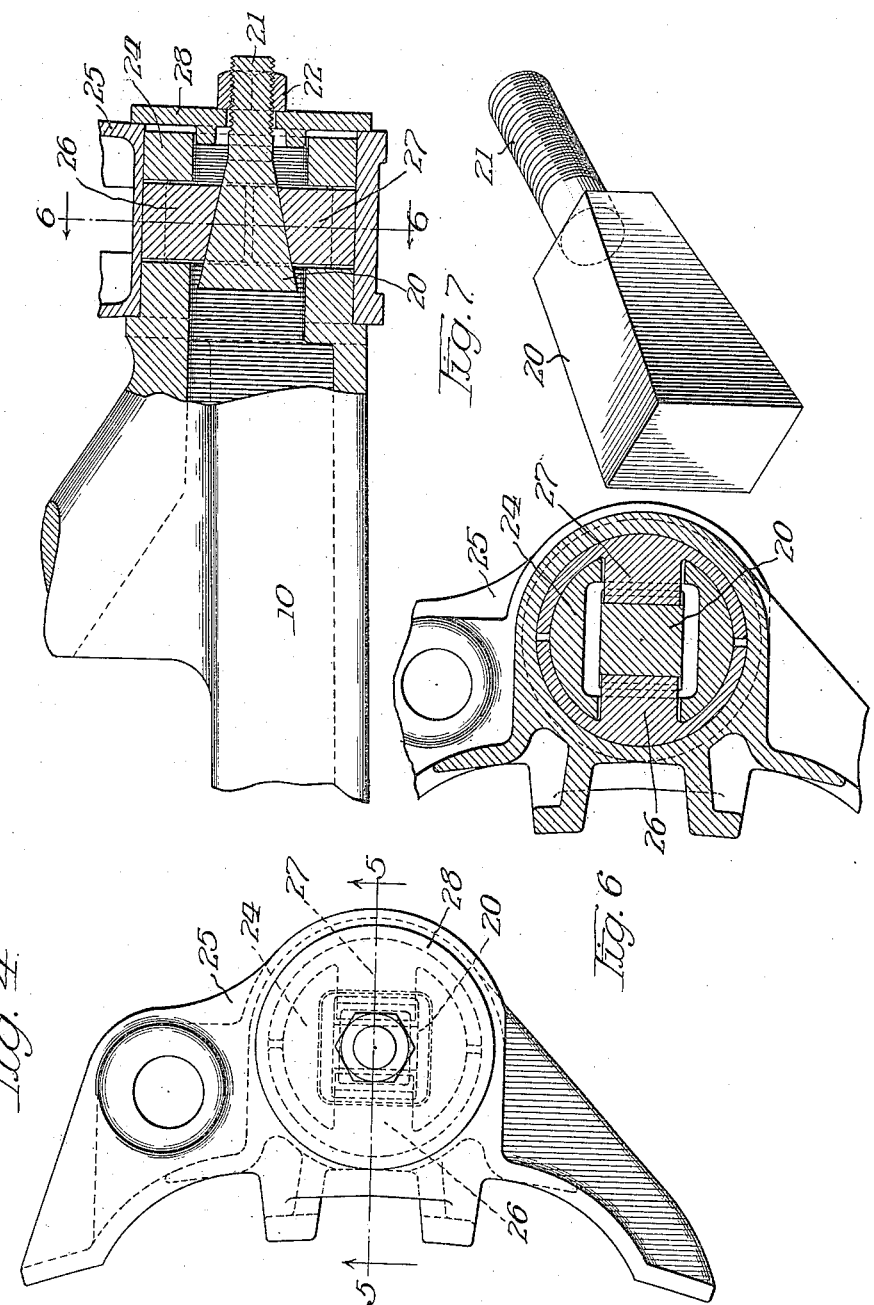

GEORGE G. FLOYD, OF CHICAGO, ILLINOIS, ASSIGNOR TO THE AMERICAN STEEL FOUNDRIES, OF NEW YORK, N. Y., A CORPORATION OF NEW JERSEY.

BRAKE-HEAD.

1,165,660.   Specification of Letters Patent.   Patented Dec. 28, 1915.

Application filed October 29, 1915. Serial No. 58,519.

*To all whom it may concern:*

Be it known that I, GEORGE G. FLOYD, a citizen of the United States, residing in Chicago, county of Cook, and State of Illinois, have invented certain new and useful Improvements in Brake-Heads, of which the following is a specification.

My invention relates to railway brakes and has particular reference to a novel adjustable brake head.

As is well known, it is common to employ means in connection with the brake beam for adjustably securing the brake heads on the ends of the beams. Such devices have assumed a great variety of forms, some or all of which are subject to objection.

An object in the present construction is to provide an adjustable head particularly adapted for use in connection with cast brake beams which shall be at once simple, economical and easy of application and removal.

A further object is to provide a locking device which shall exert its force in a line substantially parallel to the line of application of braking force by the beam through the head to the wheel. This for the reason that to apply the force in any other line is to make it necessary to overcome the force exerted by the beam in applying the brake, which force will be exerted at another angle. By applying the force in a rigid manner in a line parallel with the line of applied force, I am enabled to secure the head in adjusted position with a minimum of effort and with the assurance that the adjustment will not be changed due to any action of the beam in applying the braking force.

A still further object is to provide a wedge-locking device which is actuated by a nut, the bearing for the nut comprising means for maintaining the head in position on the beam.

The invention will be more readily understood by reference to the accompanying drawings wherein:

Figure 1 is a side elevation of a brake head constructed in accordance with my invention; Fig. 2 is a partial sectional view on the line 2—2 of Fig. 1; Fig. 3 is a section on the line 3—3 of Fig. 2; Fig. 4 is a view similar to Fig. 1 showing a slightly modified construction; Fig. 5 is a partial section on the line 5—5 of Fig. 4; Fig. 6 is a section on the line 6—6 of Fig. 5; and Fig. 7 is a perspective view of the wedge block which I prefer to employ.

Referring more particularly to the drawings it will be seen that the brake beam to which my improvement is applied may preferably comprise a compression member 10, tension member 11 and sleeve 12, all of these parts being cast integral. The sleeve is provided with a longitudinal recess 13 and a transverse recess 14, the last-named recess extending entirely through the sleeve transversely and being located in a line parallel to the application of force by the beam to the wheel. Mounted on the sleeve 12 is a brake head 15 of the usual type. In the construction shown in Figs. 1 to 3 the head is not mounted directly on the sleeve, but finds a bearing on two arcuate locking devices 16, 17 each of which is provided with a radial inward projection 18, 19 the inner face of each of which is inclined, the inclination being in a reverse direction forming therebetween a wedge-shaped space. Mounted within this space and acting upon the locking devices is a wedge 20, the wedge being located in the longitudinal recess 13 of the sleeve. The outer end 21 of the wedge is threaded and accommodates the nut 22. The bearing for the nut comprises a plate or washer 23, the periphery of which lies against the brake head 15.

It will be seen that by exerting an outward pull on the wedge member through the instrumentality of the nut a double function is secured, that of locking the head in adjusted position and preventing the removal of the head from the end of the beam.

In the construction shown in Figs. 4 to 6 the sleeve 24 provides a direct bearing for the head 25. The sleeve is provided with the same longitudinal and transverse recesses and in the longitudinal recess the same locking bolt is used as shown in preceding figures. The arcuate locking device 26, 27 likewise appear the same in the end elevation but are of a less width, and therefore contact but a portion of the interior surface of the brake head at its point of engagement with the sleeve. The head may be held in place on the sleeve by the same form of washer 28 and the locking action is the same as that described in the preceding figures.

A locking device such as I have described will be found to be efficient in service and is particularly adapted for use with cast beams in which the sleeve is formed as a portion of the truss of the beam. In such a construction, the sleeve may be made hollow at its axis, which would not be possible in the usual form of built-up trusses employed in brake beam construction.

I claim:

1. In a device of the class described, the combination of a beam having a hollow sleeve at each end thereof, a head mounted on said sleeve, a pair of head locking devices projecting radially in opposite directions through said sleeve, and a wedge member acting axially of said sleeve upon said locking devices, substantially as described.

2. In a brake beam, the combination of a sleeve having longitudinal and transversal openings therein, a head mounted on said sleeve, and a pair of oppositely-disposed locking devices one portion of each of which projects through one of the transverse apertures in said sleeve and the other portion of which bears against the inner surface of said head, and an axially-mounted wedge located within the longitudinal opening in said sleeve and acting upon said locking devices to force the same outwardly, substantially as described.

3. In a device of the class described, the combination of a beam having a sleeve at each end thereof, said sleeve being provided with a longitudinal and a transverse recess, said recesses being in communication, a head rotatably mounted on said sleeve, and a pair of wedge locking devices interposed between said head and said sleeve and having portions projecting through the transverse apertures of said sleeve, and a wedge mounted in the longitudinal recess in said sleeve and acting by an axial pull to force the locking devices outwardly, substantially as described.

4. In a locking device for brake heads, the combination of a sleeve, a head rotatably mounted on said sleeve, a pair of locking devices projecting in opposite directions through the transverse walls of said sleeve, a washer bearing upon said head exteriorly of said sleeve, and a wedge member coöperating with said locking devices and with said washer whereby said head is held against rotative movement, substantially as described.

5. In a locking device for brake heads, the combination of a sleeve, a head rotatably mounted on said sleeve, a pair of locking devices projecting in opposite directions through the transverse walls of said sleeve, a washer bearing upon said head exteriorly of said sleeve, a wedge member coöperating with said locking devices and with said washer whereby said head is held against rotative movement by combined expansive pressure applied to the inner face of the head and by a clamping action applied by the washer to the exterior of the head, substantially as described.

6. In a locking device for brake heads, the combination of a sleeve which is transversely and longitudinally recessed, a pair of arcuate locking devices having portions projecting radially into the transverse recesses in said sleeve, and an axial wedge acting upon said projections, a washer exteriorly of said beam the periphery of which bears upon said head, and means for exerting pressure through said washer to thereby force said arcuate members outwardly, substantially as described.

GEORGE G. FLOYD.

Witnesses:
J. F. LYNN,
CHAS. GARDNER.

Copies of this patent may be obtained for five cents each, by addressing the "Commissioner of Patents Washington, D. C."